US006601809B1

(12) United States Patent
Gebrara

(10) Patent No.: US 6,601,809 B1
(45) Date of Patent: Aug. 5, 2003

(54) VALANCE BRACKET FOR HORIZONTAL BLINDS

(76) Inventor: Robert Gebrara, 5300 NW. 167th St., Hialeah, FL (US) 33014

( * ) Notice: Subject to any disclaimer, the term of this patent is extended or adjusted under 35 U.S.C. 154(b) by 0 days.

(21) Appl. No.: 10/117,919

(22) Filed: Apr. 5, 2002

(51) Int. Cl.[7] ........................... A47B 96/06; E04G 3/00; F16B 1/00; G09F 7/18

(52) U.S. Cl. ........................... 248/229.16; 248/231.81; 160/38

(58) Field of Search ....................... 248/231.81, 229.16, 248/316.7; D8/395, 373; 160/38, 178.1 R, 19, 39; 24/350, 329, 336, 129 W

(56) References Cited

U.S. PATENT DOCUMENTS 2,713,469 A * 7/1955 Wright
3,155,360 A * 11/1964 Cassells
3,965,540 A * 6/1976 Moore ........................ 24/84 R
4,079,770 A * 3/1978 Woodle ....................... 160/19
4,222,156 A * 9/1980 Anderle ...................... 24/73 B
4,254,814 A * 3/1981 Vecchiarelli ................. 160/19
4,354,300 A * 10/1982 Anderle ...................... 24/343
4,384,605 A * 5/1983 Schaeffer et al. ............. 160/38
4,828,002 A * 5/1989 Ashby ........................ 160/38
4,840,216 A * 6/1989 John ....................... 160/178.1

* cited by examiner

*Primary Examiner*—Gwendolyn Baxter
(74) *Attorney, Agent, or Firm*—Robert M. Dowrey, P.A.

(57) ABSTRACT

A bracket removably attaches to the front wall of a U-shaped headrail of a horizontal blind assembly for supporting an elongate decorative valance in covering relation to the front wall in order to conceal the headrail from view. The bracket includes a vertically extending main body having a front face and a rear face. Upper and lower prong members project outwardly from the top and bottom ends of the main body, respectively, and are structured and disposed for accommodating a range of valance heights in grasped, captivated receipt between distal ends of the prongs and the front face of the main body. An integral arm member extends downwardly from the top end of the main body, in spaced relation to the rear face for removably clipping the bracket to the front wall of the headrail at select positions, including a raised position when the headrail is "outside" mounted and a lowered position when the headrail is "inside" mounted.

3 Claims, 2 Drawing Sheets

VALANCE BRACKET FOR HORIZONTAL BLINDS

BACKGROUND OF THE INVENTION

1. Field of the Invention

The invention relates to a valance support bracket and, more particularly, to a support bracket which is adapted to hold an elongate decorative valance panel in covering relation to the headrail of a horizontal blind assembly, and including means for holding the decorative valance panel in a first position when the headrail is mounted outside of a window or door cavity and a second position when the headrail is mounted inside of a window or door cavity.

2. Discussion of the Related Art

Horizontal blind assemblies, also referred to as Venetian blinds, typically include a headrail which contains the operating mechanism for raising, lowering and tilting the horizontal slats of the blind assembly. The headrail is generally defined by a U-shaped, upwardly opening channel having a front wall and a parallel rear wall. The front and rear walls extend upwardly from a bottom wall and terminate at upper rims on opposite sides of the top open gap of the channel which contains the operating mechanism. The rims are typically formed by a return bend in the top edges of the front and rear walls. Horizontal blinds are used in both the "inside" and "outside" type mountings. An "inside" mount is characterized by the headrail being mounted within a window or door wall cavity, wherein the horizontal blind assembly is generally mounted flushly with the room interior wall. "Outside" mounted horizontal blinds are mounted directly on a door or window surface, or on the room interior wall surface, and extend into the room, thereby revealing the opposite ends and the top open gap of the channel of the headrail.

It is well known to attach a decorative valance to the headrail of a horizontal blind assembly for the purpose of concealing the headrail and enhancing the attractive appearance of the blind assembly and window or door. Typically, decorative valances consist of an elongate, generally planar strip of plastic, wood or fabric which may resemble the horizontal slats of the blind assembly. Most plastic and wood valance strips used in the industry are formed to have an end profile that includes an upper lateral lip and a lower lateral lip which are conveniently configured for removable receipt within the grasp of projecting hooks or prongs of a valance bracket. The valance bracket is structured to clip onto the front wall of the headrail so that the decorative valance strip, held within the grasp of the hooks, is positioned in covering relation to the outer exterior face of the front wall. The bracket is securely positioned on the headrail when the top rim on the front wall is received within a bight formed in the clip structure of the bracket. An example of a valance bracket of this type is disclosed in U.S. Pat. No. 4,384,605 to Schaeffer et al.

Heretofore, valance mounting brackets have been made specifically for either an "outside" mount or an "inside" mount as described above. When the horizontal blind assembly is mounted as an outside mount, with the headrail mounted directly to the door or window surface, or the interior wall surface, it is desirous to support the decorative valance at a position which hides the top open gap of the headrail channel from normal view. More specifically, with an outside mount, a specifically designed outside bracket, often referred to as an "OB" bracket, is used to support the top lateral edge of the decorative valance strip at a position which is higher than the top rims of the front and rear walls of the header channel. Alternatively, when a horizontal blind assembly is mounted as an inside mount, a specifically designed inside bracket, often referred to as an "IB" bracket, is used to support the decorative valance strip so that the top lateral edge of the valance strip is at approximately the same level as the top rims of the front and rear walls. This lowered position of the IB bracket is also necessary to prevent obstruction when mounting the headrail to the overhead surface of the window or door cavity. Presently, there is no known valance mounting bracket which accommodates both an inside mount and an outside mount of the horizontal blind assembly.

A further shortcoming in the present state of the art is the inability of valance mounting brackets to accommodate various heights of valance strips. The height (vertical) of the valance strip is measured between the top lateral edge and the bottom lateral edge. Existing valance mounting brackets are generally made to accommodate a specific size valance strip. Unfortunately, depending upon the manufacturer of the valance strip, the actual height of the valance strip may vary, despite being identified as a particular standard size. Because the hook or prong members of existing valance brackets are not sufficiently resilient and flexible, they often crack or break off when attempting to secure a valance strip to the bracket which is higher (i.e. greater distance between the top and bottom lateral edges) than the standard. Moreover, valance strips which are lower in height than the standard cannot be adequately grasped by the prong members of existing valance brackets and, as a result, these reduced height valance strips often dislodge from the brackets and fall from the headrail.

Accordingly, there is an urgent need in the blind industry for an improved valance bracket which accommodates both an inside mount and an outside mount. Further, there is an urgent need for an improved valance mounting bracket which accommodates a range of heights of valance strips.

SUMMARY OF THE INVENTION

The present invention is directed to a valance bracket which removably attaches to the front wall of a U-shaped headrail of a horizontal blind assembly for supporting an elongate decorative valance in covering relation to the front wall in order to conceal the headrail from view. The bracket includes a vertically extending main body having a front face and a rear face. Upper and lower prong members project outwardly from the top and bottom ends of the main body, respectively, and are structured and disposed for accommodating a range of valance heights in grasped, captivated receipt between distal ends of the prongs and the front face of the main body. An integral arm member extends downwardly from the top end of the main body, in spaced relation to the rear face for removably clipping the bracket to the front wall of the headrail at select positions, including a raised position when the headrail is "outside" mounted and a lowered position when the headrail is "inside" mounted.

OBJECTS AND ADVANTAGES OF THE PRESENT INVENTION

With the foregoing in mind, it is a primary object of the present invention to provide a bracket for securing a decorative valance strip to the headrail of a horizontal blind assembly, and wherein the valance bracket is adapted to hold the valance strip at a plurality of select positions to accommodate both an inside mount and an outside mount of the horizontal blind assembly.

It is a further object of the present invention to provide an improved valance mounting bracket which is structured to accommodate a range of valance strip heights in a manner which holds the valance strip securely within the grasp of the bracket without breaking the bracket or dropping the valance strip.

It is still a further object of the present invention to provide an improved valance bracket which functions as both an inside bracket (IB) and an outside bracket (OB).

It is still a further object of the present invention to provide an improved valance bracket which functions as both an inside bracket (IB) and an outside bracket (OB) and which is formed as one integral piece.

It is still a further object of the present invention to provide an improved valance bracket, as described above, which is inexpensive and easy to install.

It is still a further object of the present invention to provide an improved valance bracket, as described above, which is of a low-profile design so that the valance bracket is not easily viewable when installed to hold a decorative valance strip on the headrail of a horizontal blind assembly.

These and other objects and advantages of the present invention are more readily apparent with reference to the following detailed description and the accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 3:
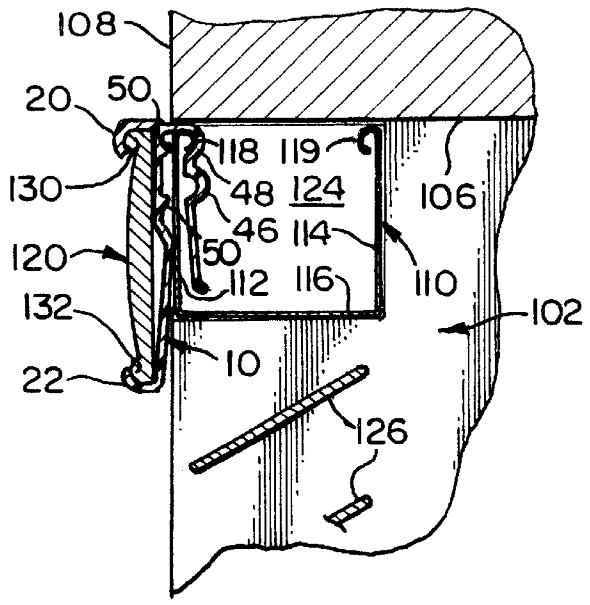
FIG. 3 is a sectional view taken along line 3—3 of FIG. 1.
Figure 4:
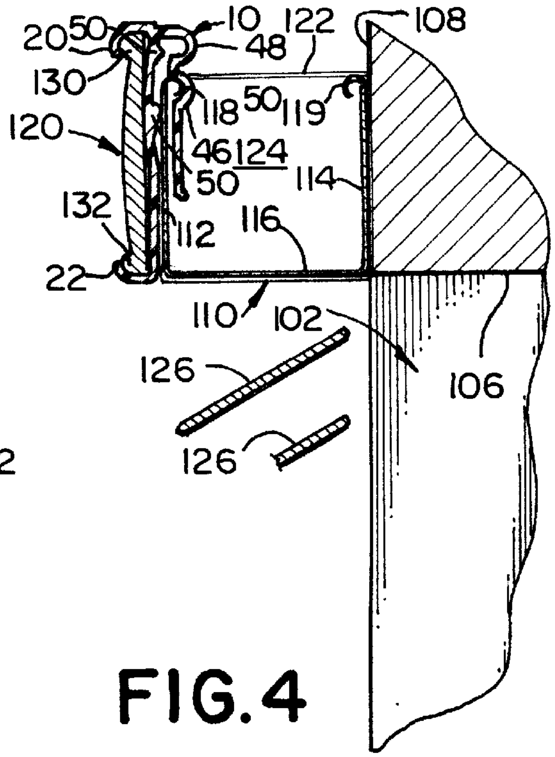
FIG. 4 is a sectional view taken along line 4—4 of FIG. 2.

Referring to the several views of the drawings, the valance bracket of the present invention is shown and is generally indicated as 10. The valance bracket 10 is specifically structured for removably attaching an elongate decorative valance strip 120 to the headrail 110 of a horizontal blind assembly 100. As best seen in FIGS. 3 and 4, the headrail is defined by a U-shaped upwardly open channel having a front wall 112, a rear wall 114 and a bottom wall 116. The front and rear walls extend upwardly from the bottom wall and terminate at top rims 118, 119, respectively. The top rims 118, 119 extend along opposite sides of a top open gap 122 of the channel 124 of the headrail. An operating mechanism (not shown) is contained within the channel and controls raising, lowering and tilting of horizontal slats 126 of the horizontal blind assembly 100. The valance strip 120 is typically formed of wood or plastic and includes a top lateral edge with protruding lip 130 and a bottom lateral edge with protruding lip 132. The height of the valance strip 120 is the greatest vertical distance measured between the top lateral edge and the bottom lateral edge. The valance bracket 10 of the present invention is specifically structured for attaching the decorative valance strip 120 to the front wall 112 of the headrail 110 in a manner which conceals the headrail from normal view when the horizontal blind assembly 100 is installed. As described more fully hereinafter, the valance bracket 10 is specifically structured and disposed for holding the valance strip at either of two selected positions (as seen in FIGS. 3 and 4) depending upon the type of installation of the blind assembly. More specifically, the valance bracket 10 is adapted to accommodate both an "inside" mount, as seen in FIG. 3, and an "outside" mount as seen in FIG. 4.

Figure 1:
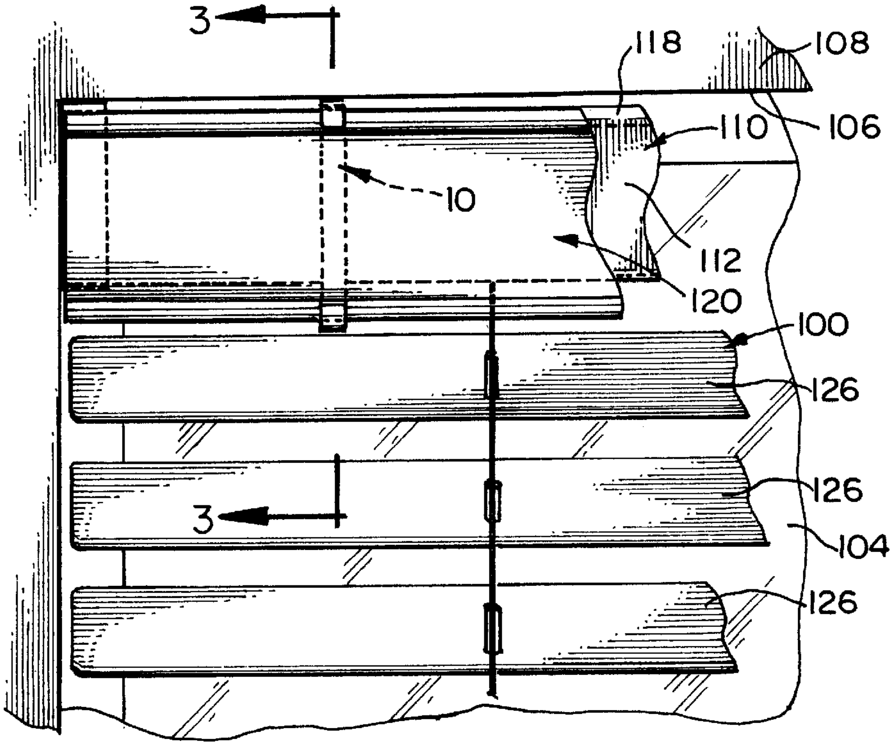
FIG. 1 is an isolated front elevation showing the valance bracket of the present invention used to support a decorative valance strip in covering relation to a headrail of an inside mounted installation of a horizontal blind assembly.

Referring to the drawings, and initially FIGS. 1 and 3, a typical window as seen from the building interior is shown with a horizontal blind assembly 100 mounted in an "inside" type installation within the cavity 102 surrounding the window 104. In this instance, the headrail 110 is mounted to the overhead horizontal surface 106 within the cavity 102 so that the front wall 112 of the headrail is generally flush with the interior wall surface 108. In this particular type of installation, the valance bracket 10 and valance strip 120 are attached to the front wall 112 of the headrail 110 and positioned at a lower position with the top edge of the valance 120 positioned at generally the same level as the top rim 118. In this position, as shown in FIG. 3, the valance bracket 10 functions as an IB or "inside" mount bracket.

Figure 2:
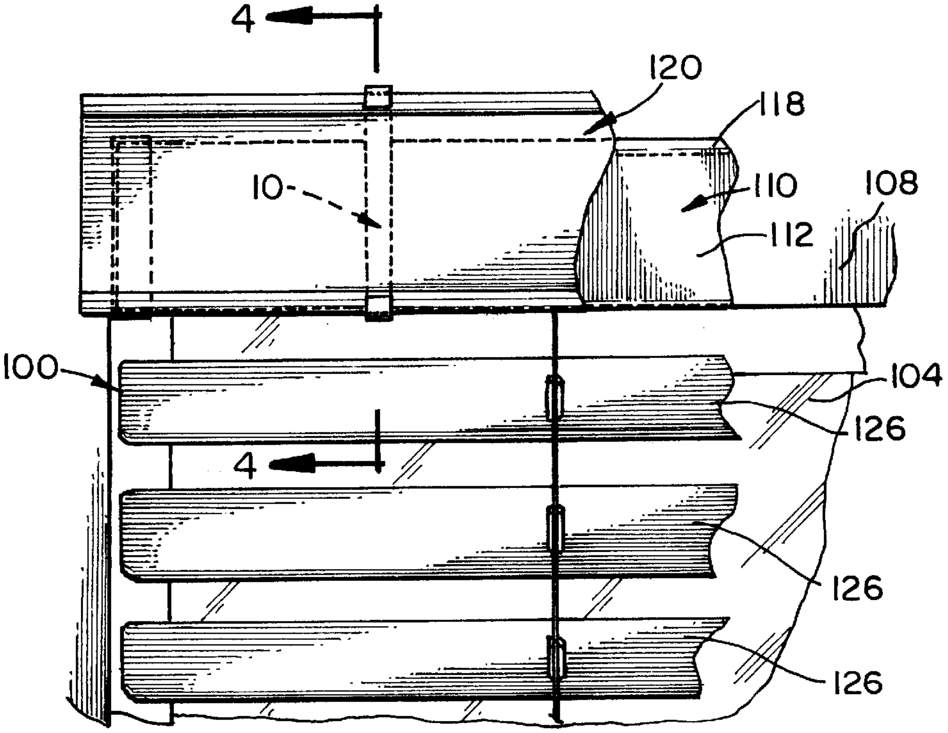
FIG. 2 is an isolated front elevation showing the valance bracket of the present invention used to support a decorative valance strip in covering relation to a headrail of an outside mounted installation of a horizontal blind assembly.

Referring to FIG. 2, a typical window as seen from the building interior is shown with the horizontal blind assembly 100 mounted in an "outside" type installation. In this instance, the headrail is mounted directly on the interior wall surface 108, above the wall cavity 102 so that the headrail and horizontal slats are positioned towards the interior of the room and beyond the vertical plane of the interior wall surface, as best seen in FIG. 4. This same type of installation may be used directly on a door or window surface, such as along the top frame of the door or window. More specifically, the headrail 110 of the horizontal blind assembly 100 may be mounted directly to the frame of a swinging door or window, so that the horizontal blind assembly 100 extends into the room, beyond the door or window surface. As seen in FIG. 4, the bracket 10 and valance 120 are positioned so that the top lateral edge of the valance 120 is higher than the top rim 118 of the headrail 110 so that the valance at least partially conceals the open top 122 of the channel from normal view. This valance mount position, on an "outside" mount is noticeably higher than the valance position shown in FIG. 3 for an "inside" mount. In this type of installation, the bracket 10 functions as an OB or "outside" mount bracket.

Figure 5:
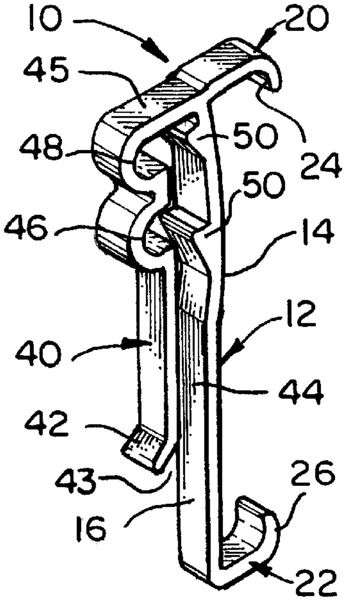
FIG. 5 is a front, side perspective view of the valance bracket of the present invention.
Figure 6:
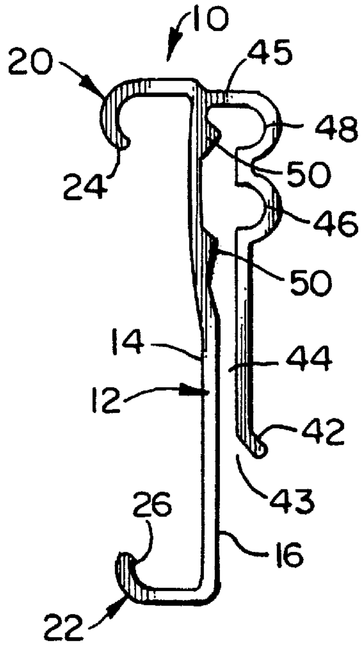
FIG. 6 is a side elevational view of the valance bracket.

As seen in FIGS. 5 and 6, the valance bracket 10 includes an elongate main body 12 having a front face 14 and a rear face 16. Upper and lower prong members 20, 22 extend outwardly from the opposite upper and lower ends of the main body, respectively, extending beyond the front face. The distal end portions 24, 26 of the respective upper and lower prong members 20, 22 are curled inwardly towards one another and are structured and disposed for captivating the valance strip 120 within the grasp of the upper and lower prong members and against the front face of the main body. More specifically, the upper and lower prong members 20,

22, including the respective distal end portions 24, 26, are specifically structured and disposed to wrap around the upper and lower lateral lips 130, 132 of the valance strip so that the valance strip is grasped between the prong members and held against the front face of the main body. In a preferred embodiment, the upper and lower prong members are integrally formed with the main body and are able to flex outwardly, away from one another, in an expanding motion to thereby permit insertion and removal of the decorative valance strip from within the grasp of the prong members. Further, the prong members are resilient in nature, having a flexible memory which allows the prong members to return to a normally relaxed position. The flexible nature of the prong members allows for a tolerance in height differences of valance strips from different manufacturers. Specifically, the prong members are able to accommodate variances of height of the valance strip of up to ⅜ of an inch, while holding the valance strip, throughout that range, in snug, grasped receipt between the prong members and against the front face of the main body so that the valance member is held tight without breaking or cracking the prong members.

An integral arm member 40 projects outwardly from an upper end of the main body and extends downwardly in spaced relation to the rear face of the main body, forming a clip for removable attachment of the bracket 10 to the front wall 112 of the headrail 110. A lower end 42 of the arm member 40 is flared outwardly, forming a mouth 43 for guiding receipt and passage of the top rim 118 of the front wall of the headrail between the arm member 40 and the rear face 16 of the main body 12 when attaching the bracket to the headrail. The arm member is able to flex at the upper end 45, thereby enlarging the gap 44 separating the arm member and the rear face of the main body so that the top rim of the front wall can pass therebetween and into position within one of two bights formed in the upper portion of the arm member. Specifically, a lower bight 46 is structured and disposed for receipt of the top rim 118 of the front wall of the headrail when positioning the bracket 10 for an outside mount, thereby defining an OB bracket. A second or upper bight 48 is structured and disposed for receipt of the top rim when the bracket is positioned lower on the headrail for an inside mount, thereby defining an IB bracket. When the upper rim is positioned within either of the first or second bights, the arm member returns to a relaxed position, as best seen in FIGS. 4 and 6. Nubs 50 formed on the rear face of the main body are structured and disposed to maintain pressure on the outer surface of the front wall so that the bracket 10 is held snugly on the headrail 110 with the front wall sandwiched firmly between the rear face of the main body and the arm member. The flared lower end 42 of the arm member 40 permits grasping with the finger to slightly separate the arm member from the main body when removing the bracket from the headrail.

While the instant invention has been shown and described in accordance with a preferred and practical embodiment thereof, it is recognized that departures from the instant disclosure are contemplated within the spirit and scope of the present invention as set forth in the following claims and under the doctrine of equivalents.

What is claimed is:

1. A bracket for removably supporting an elongate valance strip on a headrail of a blind assembly, wherein the headrail includes a front wall with a top rim, said bracket comprising:

a vertically extending main body having a front face, a rear face, an upper end and a lower end;

grasping members integrally formed with said main body for removably holding the valance strip on said bracket, said grasping members comprising:

an upper prong member integrally formed with said main body and extending outwardly from said front face at said upper end;

a lower prong member integrally formed with said main body and extending outwardly from said front face at said lower end; and said upper and lower prong members being structured and disposed to grasp and hold the valance strip therebetween and said upper and lower prong members being further structured and disposed to flex outwardly relative to one another to adjust for a variance in valance strip sizes;

a clip member integrally formed with and extending from said main body and including an arm member extending downwardly from said upper end of said main body in spaced, opposing relation to said rear face, said arm member being normally urged to a relaxed position for applying pressure to the front wall of the headrail when the front wall of the headrail is sandwiched between said arm member and said rear face of said main body, and said arm member being structured to flex outwardly away from said rear face upon application of an external force thereto to facilitate attachment and removal of said bracket on the headrail;

at least one nub formed on said rear face of said main body and said nub being structured and disposed to maintain pressure on an opposite side of the front wall of the headrail when the wall of the headrail is sandwiched between said arm member and said rear face of said main body; and said arm member including a plurality of bights formed therein, including a first bight structured and disposed for receipt of the top rim of the headrail therein for holding said bracket on the headrail at a first position to position the valance at a first height relative to the headrail, and said arm member further including a second bight structured and disposed for receipt of the top rim of the headrail therein for holding said bracket on the headrail at a second position to position the valance at a second height relative to the headrail.

2. A bracket for removably supporting an elongate valance strip on a headrail of a blind assembly, wherein the headrail includes a front wall with a top rim, said bracket comprising:

a vertically extending main body having a front face, a rear face, an upper end and a lower end;

grasping members integrally formed with said main body for removably holding the valance strip on said bracket, said grasping members comprising:

an upper prong member integrally formed with said main body and extending outwardly from said front face at said upper end;

a lower prong member integrally formed with said main body and extending outwardly from said front face at said lower end; and said upper and lower prong members being structured and disposed to grasp and hold the valance strip therebetween and said upper and lower prong members being further structured and disposed to flex outwardly relative to one another to adjust for a variance in valance strip sizes;

a clip member integrally formed with and extending from said main body and including an arm member extending downwardly from said upper end of said main body in spaced, opposing relation to said rear face, said arm member being normally urged to a relaxed position for applying pressure to the front wall of the headrail when the front wall of the headrail is sandwiched between said arm member and said rear face of said main body, and said arm member being structured to flex outwardly away from said rear face upon application of an external force thereto to facilitate attachment and removal of said bracket on the headrail;

at least one nub formed on said rear face of said main body and said nub being structured and disposed to maintain pressure on an opposite side of the front wall of the headrail when the wall of the headrail is sandwiched between said arm member and said rear face of said main body; and said arm member including means for adjustably positioning the valance relative to the headrail and including:

first positioning means for holding the bracket on the headrail so that the valance is positioned at a first height relative to the headrail; and second positioning means for holding the bracket on the headrail so that the valance is positioned at a second height relative to the headrail and wherein said second height is lower than said first height.

3. The bracket as recited in claim 2 wherein said first and second positioning means are defined by first and second bights, respectively, formed in said arm member, said first and second bights each being structured for receipt of the top rim of the front wall of the headrail therein when said arm member is in said relaxed position in engagement with the front wall of the headrail.

* * * * *